United States Patent [19]

Dover

[11] 4,384,502
[45] May 24, 1983

[54] MOTORIZED CIRCULAR MITER CHOP SAW

[75] Inventor: Donald L. Dover, Easley, S.C.

[73] Assignee: The Singer Company, Stamford, Conn.

[21] Appl. No.: 296,396

[22] Filed: Aug. 26, 1981

[51] Int. Cl.³ .............................................. B27B 5/20
[52] U.S. Cl. .................................. 83/471.3; 83/473; 83/522; 83/581; 83/490
[58] Field of Search ...................... 83/471.3, 490, 522, 83/473, 581

[56] References Cited

U.S. PATENT DOCUMENTS 4,245,533  1/1981  Batson ............................... 83/471.3

Primary Examiner—Donald R. Schran
Attorney, Agent, or Firm—Edward P. Schmidt; Robert E. Smith; Edward L. Bell

[57] ABSTRACT

A motor operated circular miter chop saw is pivotally mounted on a generally horizontal axle pivot pin about which it rotates in a vertical plane with the axle pivot pin being carried by a cast support base structure provided with means allowing both lateral adjustment and vertical adjustment of each end of the axle pivot pin. Angular orientation of the work piece is provided by an angularly adjustable fence rotatably carried by the cast base.

4 Claims, 3 Drawing Figures

MOTORIZED CIRCULAR MITER CHOP SAW

DESCRIPTION

1. Field of the Invention

This invention relates to powered circular saws and, more particularly, to a powered circular saw hingedly mounted to a table having a rotatably positionable fence for cutting elongated stock material such as wood to length at various reproducible angles.

2. Background of the Invention

In various crafts projects it is useful to be able to accurately cut elongated stock material, such as strips of wood, or the like, to length and at accurately reproducible angles. For example, in many construction projects it is desired to cut strips of wood so that the end cut is square, that is, perpendicular to the longitudinal axis of the wood strip. At other times it is desirable to cut at angles other than 90° such as at a 45° angle to enable two such strips to be mitered to provide a square or right angle corner joint. Motorized miter saws, in which a power driven circular saw is pivotally supported on a support member for vertical swinging movement downwardly from a normal inoperative rest position towards a work support base structure while also pivotally supporting the saw support member on a vertical axis for angular swinging movement to preselected angular positions to effect a desired angle cutting of the work piece have been previously shown and saws of this type are disclosed for example, in Niehaus et al U.S. Pat. No. 3,821,918 and are commonly referred to as chop saws. A disadvantage of such saws is the necessity for pivoting the saw assembly for angular setting and the weight and vibration of the saw necessitates that the saw support member be rather heavy and closely machined to provide for long life and continued accuracy. Among other disadvantages, this necessity makes such construction more expensive than might be otherwise desirable. Moreover, since the saw blade must descend to a position beneath the work supporting surface in order to completely sever the work piece, means must be provided to enable the saw to pass through the work supporting surface at a number of angular positions which further increases the complexity and, accordingly, the cost of such saws. In some saws this is achieved by providing a rotating platform which rotates with the saw, further adding to the complexity and expense of the machine and to the mass which must be swung during angular setting. If such means are not provided, then a disposable work supporting surface, such as a piece of scrap wood, must be used beneath the work piece or a movable fence, or the like must be provided to enable relative lateral movement of the work piece and the saw path, therefore necessitating both the chopping movement of the saw and lateral movement of the work piece or saw which results in a loss of convenience and a possible lessening of accuracy as well as an increase in complexity and expense.

Without getting into truly massive or welded structures for the work support base structure, the most economical basic fabrication method to provide the requisite rigidity and strength is to cast the structure of metal. While such cast structures are basically inexpensive in comparision with a welded structure, a cast structure has the basic inconvenience that working surfaces need to be subsequently machined because the surface finish produced by processes such as casting are generally insufficient for work supporting surfaces and are definitely insufficient for bearing surfaces about which the chop saw pivots. Moreover, because of the limitation of the sand casting process and the contraction of metal during cooling following casting, actual dimensions are subject to substantially large tolerances which necessitate that critical surfaces and the structure defining pivotal axis be subsequently machined and each machining operation necessitated by the design generally increases the cost of the machine.

In U.S. Pat. No. 4,245,533, assigned to the assignee of the present application, there is disclosed a novel construction for miter chop saws wherein the saw is mounted for pivotal movement about an axle bolt, one end of which is mounted by means allowing lateral adjustment and the other end of which is mounted by means allowing vertical adjustment by spring loading against an adjustable stop. In the present application, on the other hand, there is disclosed an arrangement also minimizing machining but wherein the saw is carried by an axle pin positively adjustable transversely and both laterally and vertically at each end.

OBJECTS OF THE INVENTION

Accordingly, it is a primary object of the present invention to provide novel and improved miter saws designed, constructed and arranged to maximize economy of production while simultaneously maintaining acceptable accuracy.

Another primary object of the present invention, in addition to the foregoing object, is the provision of novel and improved miter saws utilizing a cast base structure to which a motor powered circular chop saw is pivotally mounted for rotation about a horizontal axis wherein a minimum of machining is required to the base structure casting.

Yet another primary object of the present invention, in addition to each of the foregoing objects, is the provision of such a miter saw wherein novel and improved mounting means are utilized for mounting the motor powered circular chop saw to the base support structure defining a work support surface wherein the axis of rotation is adjustable in a first direction rotationally in a plane generally parallel said work support surface and in a second direction rotationally in a plane generally perpendicular said work support surface while the axle itself is adjustable longitudinally so as to enable accurate orientation of the motor powered chop saw relative the base support structure without requiring excessive accuracy in the initial fabrication of the cast base support structure.

Yet still another primary object of the present invention, in addition to each of the foregoing objects, is the provision in such a circular chop saw of an adjustable axle pin therefore, each end of which is so adjustable in said first and second directions.

Still another primary object of the present invention, in addition to each of the foregoing objects, is the provision of novel and improved motor powered circular miter chop saws wherein rotation of the motor powered chop saw relative to the base is not required for adjustment of angular orientation to the work piece to be cut whereby the mounting means between the motor powered chop saw and the cast mounting base structure need only provide for rotation of the motor driven circular chop saw about a horizontal axis for movement of the motor driven chop saw in a vertical plane, and thereby enabling novel and improved adjustment means to be utilized for adjusting the orientation of the rotational axis of the motor driven chop saw relative the cast base support structure.

Yet still another primary object of the present invention, in addition to each of the foregoing objects, is the provision of such motor driven miter chop saws wherein the rotational axis for the motor driven chop saw relative the cast base support structure comprises means at each end of an axle pin around which the motor powered circular saw pivots for providing both lateral adjustment and vertical adjustment thereof whereby accurately machined sockets in the base support for the two ends of the axle bolt are not required.

It is a feature of the present invention that the saw is constructed primarily from relatively inexpensive castings eliminating a number of parts from conventional construction and requiring a minimum of machined parts maximizing economy of manufacture while yet providing an accurate and durable tool.

The invention resides in the combination, construction, arrangement and disposition of various component parts and elements incorporated in improved motor driven circular miter chop saws constructed in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention a motor operated circular miter chop saw is pivotally mounted on a generally horizontal axle pin or trunnion about which it rotates in a vertical plane with the axle pin or trunnion being carried by a cast support base structure provided with means allowing positive lateral adjustment of each end of the axle bolt plus positive vertical adjustment of each end thereof enabling inexpensive and easy positive adjustment for manufacturing tolerances in the cast support base structure. Angular orientation of the work piece is provided by an angularly movable fence rotatably carried by the cast base support structure with the fence having lugs cooperating with an arcuate slot or groove provided in the cast base support structure. The cast base support structure is also provided with an arcuate slot extending perpendicular the chop saw axle pin to provide clearance for the circular saw blade, the blade being aligned with the arcuate slot by the axle pin adjustment means.

While the saw described is primarily intended for the cutting of soft material such as wood, utilizing a wood cutting blade, it is intended that this application also cover similar devices provided with metal cutting blades, abrasive discs, and the like, for cutting and facing diverse materials.

BRIEF DESCRIPTION OF THE DRAWING

Further objects and features of the present invention will appear from the following description and appended claims when read in conjunction with the accompanying drawings wherein:

DETAILED DESCRIPTION OF THE INVENTION

Figure 1:
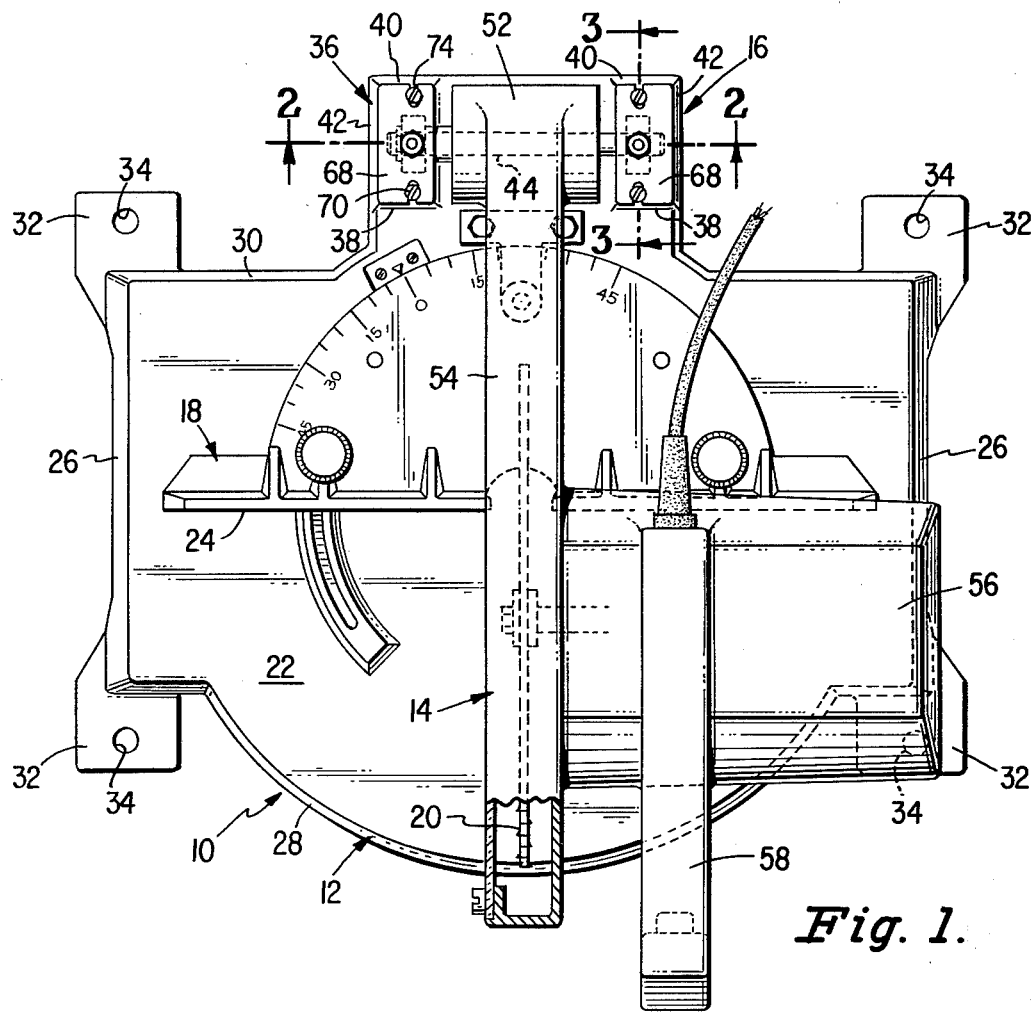
FIG. 1 is a top plan view, partially broken away, of a motorized circular miter chop saw constructed in accordance with the present invention.
Figure 2:
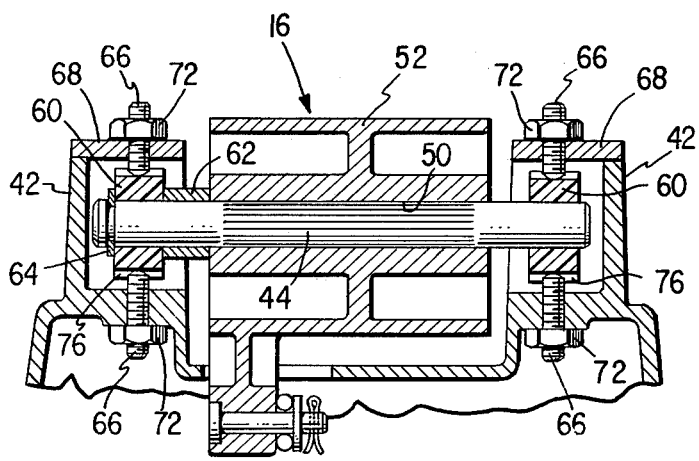
FIG. 2 is an enlarged elevational cross sectional partial view of the hinge portion of the chop saw in FIG. 1 taken along line 2—2 of FIG. 1.

With reference now to the drawing, there is shown and illustrated a motor operated circular miter chop saw constructed in accordance with the principles of the present invention and designated generally by the reference character 10.

The miter saw 10 comprises a cast base structure designated generally by the reference character 12, a motor driven circular saw structure designated generally by the reference character 14 rotatably carried on a pivot assembly generally designated by the reference character 16 mounted with the cast base structure 12 and a rotatable fence structure designated generally by the reference character 18 rotatably carried by the cast base structure 12 for limited rotational movement about a virtual pivot located or adjacent the plane of the circular saw blade 20 of the motor driven circular saw 14. In addition, biasing means are provided for biasing the circular saw 14 in an upward direction towards an open position whereat the circular saw 14 is generally spaced above the cast base portion structure 12 for the insertion of an elongated work piece therebetween to rest on a work supporting surface 22 defined by the top surface of the cast base portion 12 and against the work supporting face 24 on the fence structure 18 generally perpendicular the work supporting surface 24. A generally arcuate depression or clearance (not shown) is provided in the cast base structure 12 in general alignment with the circular saw blade 20 to enable the circular saw blade 20 to pass through the plane of the work supporting surface 22 as the saw is lowered to cut the work piece. Further details of the base 12, fence 18, and the biasing means, and the fence mounting and adjustment means may be had by reference to the aforementioned U.S. Pat. No. 4,245,533, the entire disclosure of which is hereby incorporated by reference herein as fully and completely as if reproduced hereat.

In addition to the upper work supporting surface 22, the cast base structure 12 further comprises a pair of side walls 26, a front wall 28 and a rear wall 30, each depending therefrom with laterally outwardly extending feet 32 being integral with the lower edges of the walls 26, 28, and 30 at the four corners for supporting the miter chop saw 10 on a table, or the like. Mounting apertures 34 are provided in each foot 32 to enable the miter chop saw 10 to be fastened in position. Projecting generally rearwardly of the rear wall 30 of the cast base structure 12 and forming an integral part thereof, there is provided a generally U-shaped channel portion 36 defined by a pair of generally U-shaped pillars having front and rear walls 38 and 40, respectively, generally parallel the wall 30 and side wall portions 42 generally parallel the side walls 26, the walls 38, 40 and 42 extending upwardly above the plane of the work supporting surface 24 to define the pair of mounting ears or pillars 36 forming a part of the circular saw mounting means 16.

Figure 3:
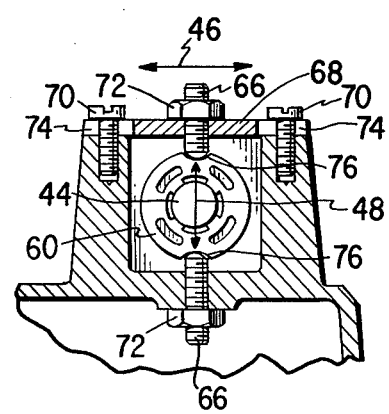
FIG. 3 is an enlarged partial elevational cross sectional view, similar to FIG. 2, taken along line 3—3 of FIG. 1.

As heretofore pointed out, the circular saw structure 14 is pivotally mounted, and the support means 16 therefore comprises a pin, pivot or trunnion 44 extending into the pillars 36 between the walls 38, 40 and 42 and adjustably mounted therein so as to be adjustable longitudinally as well as in a first direction rotationally in a plane generally parallel said work support surface 22 as indicated by the arrow 46 in FIG. 3 and in a second direction generally perpendicular said work support surface 22 as indicated by the arrow 48 in FIG. 3 as will be hereinafter described. The pin or trunnion 44 also extends through a bore 50 extending through a boss 52 integrally formed with a blade guard and motor supporting casting 54 forming the main supporting structure of the circular saw structure 14. The blade guard casting 54 has an electric motor 56 mounted to one side thereof for driving the circular saw blade 20 and carrying a handle portion 58 for enabling the circular saw assembly 14 to be controlled, i.e., lowered for cutting action and raised.

The axle pin, pivot, or trunnion 44 is held axially in position by two bearings 60 adjustably positioned one on each side thereof within the pillars 40. Each of the bearings 60 is axially adjustable as well as horizontally adjustable fore and aft in its respective pillar to define the aforesaid first direction generally parallel the work support surface 22 and also vertically adjustable within its respective pillar to define the aforesaid second direction generally perpendicular the work support surface 22. Hence, the circular saw blade 20 may be aligned with the arcuate saw clearance slot and to be perpendicular the work support surface 22. As shown in more detail in FIGS. 3 and 4, the central portion of the pin or trunnion 44 is provided with straight knurling and press fit into the boss 52. A spacer 62 is provided between the boss 52 and one of the bearings 60. An annular groove is provided adjacent that end of the axle pivot or trunnion pin 44 and a retaining ring 64 positions the axle pin or trunnion relative the bearing 60. Each bearing 60 is vertically adjusted within the pillars 36 by means of a pair of bolts or adjusting screws 66, one beneath the axle, pin or trunnion 44 and one above and passing downwardly through a hold down strap 68 attached to the walls 38 and 40, as by means of a pair of cap screws 70. A lock or jam nut 72 is provided to hold each adjusting screw 66 in position.

As mentioned, each hold down strap 68 is held in position by the cap screws 70 and apertures or slots 74 elongated in a horizontal direction are provided which are larger or longer than the cap screws 70 permitting hold down straps 68 and therefore the trunnion 44 to be laterally adjustable. The bearings 60 are provided with arcuate notches 76 for the adjusting screws 66. Hence, the trunnion 44 may be accurately and positively adjusted in all directions. In assembly, the trunnion or pin 44 is assembled with the retaining ring 64, one of the bearings 60, and the spacer 62 and then press fit into the hub or boss 52. Then the other bearings 60 is assembled thereto and the assembly secured and adjusted to the base 12.

I claim:

1. Miter saw comprising a cast base structure having a generally planar work support surface to which a motor powered circular chop saw is pivotally mounted for rotation about an axis generally parallel said work support surface, together with mounting means utilized for mounting the motor powered circular chop saw to the base support structure wherein the axis of rotation is adjustable so as to enable accurate orientation of the motor powered chop saw relative to the base support structure without requiring excessive accuracy in the initial fabrication of the cast base support structure and a work piece positioning fence rotatably carried by said base support structure, said mounting means for enabling adjustment of the rotational axis of said motor powered circular chop saw relative said cast base support structure comprises, in turn, an axle pivot trunnion pin carried by said cast base support structure, means at each end of said axle pivot trunnion pin around which the motor powered circular saw pivots for providing lateral adjustment of the axis of said pin, and means associated with each end of said axle pivot pin for providing vertical adjustment thereof, whereby a need for accurately machined sockets for the two ends of the axle pin is reduced.

2. Miter saw defined in claim 1 wherein said lateral adjustment means comprises a hold down strap carrying said vertical adjustment means having at least one horizontally elongated attachment aperture, said hold down strap being adjustably mounted with said cast support base structure by threaded fastener means passing through said elongated attachment aperture engaging said cast support base structure.

3. Miter saw defined in claim 2 wherein said vertical adjustment means comprises a vertically threaded aperture in said hold down plate and an adjustment screw extending therethrough and a further adjustment screw in said cast base generally therebeneath.

4. Miter saw defined in claim 3 further comprising a support bearing on each end of said pivot pin, each bearing being clamped between a respective pair of said adjustment screws.

* * * * *